United States Patent
Wakeford et al.

(10) Patent No.: US 10,035,068 B1
(45) Date of Patent: Jul. 31, 2018

(54) SYSTEMS AND METHODS FOR MAKING PROGRESS OF A USER CHARACTER OBTAINED IN AN ONLINE GAME VIA A NON-VIRTUAL REALITY INTERFACE AVAILABLE IN A VIRTUAL REALITY INTERFACE

(71) Applicant: Electronic Arts Inc., Redwood City, CA (US)

(72) Inventors: Kent Wakeford, Hillsborough, CA (US); Tomi Huttula, San Rafael, CA (US)

(73) Assignee: Electronic Arts Inc., Redwood City, CA (US)

( * ) Notice: Subject to any disclaimer, the term of this patent is extended or adjusted under 35 U.S.C. 154(b) by 75 days.

(21) Appl. No.: 15/048,920

(22) Filed: Feb. 19, 2016

(51) Int. Cl.
| | |
|---|---|
| *A63F 9/24* | (2006.01) |
| *A63F 13/69* | (2014.01) |
| *A63F 13/23* | (2014.01) |
| *A63F 13/63* | (2014.01) |
| *G06F 3/01* | (2006.01) |
| *H04L 29/06* | (2006.01) |

(52) U.S. Cl.
CPC .............. *A63F 13/69* (2014.09); *A63F 13/23* (2014.09); *A63F 13/63* (2014.09); *G06F 3/011* (2013.01); *H04L 67/42* (2013.01)

(58) Field of Classification Search
None
See application file for complete search history.

(56) References Cited

U.S. PATENT DOCUMENTS

| | | |
|---|---|---|
| 5,331,353 A | 7/1994 | Levenson |
| 6,527,641 B1 | 3/2003 | Sinclair |
| 6,722,984 B1 | 4/2004 | Sweeney |
| 6,913,536 B2 | 7/2005 | Tomizawa |
| 7,713,118 B2 | 5/2010 | Roemer |
| 8,527,332 B2 | 9/2013 | Selby |
| 8,814,691 B2 | 8/2014 | Haddick |

(Continued)

OTHER PUBLICATIONS

The Queen's Wrath, URL: http://destiny.wikia.com/wiki/The_Queen's_Wrath [retrieved Jan. 22, 2016] 2 pgs.

(Continued)

*Primary Examiner* — Paul A D'Agostino
(74) *Attorney, Agent, or Firm* — Knobbe, Martens, Olson and Bear, LLP

(57) ABSTRACT

A system and method for making progress of a user character obtained in an online game via a non-virtual reality interface available in a virtual reality interface. The online game may be played via multiple platforms including virtual reality platforms and non-virtual reality platforms. The actions available to be performed by users via the non-virtual reality platforms may be limited compared to the actions available to be performed via the virtual reality platforms. Gameplay progress made by a user through actions requested via a non-virtual reality platform may be monitored. An amount of a virtual resource may be awarded based on the progress, and/or exchanged for an enhancement of an ability for a virtual character controlled by the user in the online game. The ability may be enhanced such that the enhancement is reflected in the online game via the virtual reality platform.

20 Claims, 3 Drawing Sheets

(56) References Cited

U.S. PATENT DOCUMENTS

| | | |
|---|---|---|
| 9,205,338 B1 | 12/2015 | Wakeford |
| 2002/0090985 A1* | 7/2002 | Tochner .................. A63F 13/12 463/1 |
| 2002/0158917 A1 | 10/2002 | Sinclair |
| 2003/0119576 A1 | 6/2003 | McClintic |
| 2003/0211889 A1 | 11/2003 | Walker |
| 2005/0192097 A1 | 9/2005 | Farnham |
| 2005/0282638 A1 | 12/2005 | Rowe |
| 2006/0105838 A1 | 5/2006 | Mullen |
| 2006/0287080 A1 | 12/2006 | Bychkov |
| 2007/0013515 A1 | 1/2007 | Johnson |
| 2007/0173323 A1 | 7/2007 | Johnson |
| 2008/0300049 A1 | 12/2008 | Anderson |
| 2008/0300055 A1 | 12/2008 | Lutnick |
| 2009/0077463 A1 | 3/2009 | Koster |
| 2009/0183226 A1 | 7/2009 | Dean |
| 2009/0251457 A1 | 10/2009 | Walker |
| 2010/0046553 A1 | 2/2010 | Daigle |
| 2010/0056243 A1 | 3/2010 | Czyzewski |
| 2010/0093434 A1 | 4/2010 | Rivas |
| 2010/0273557 A1 | 10/2010 | Miyaki |
| 2011/0118022 A1 | 5/2011 | Aronzon |
| 2011/0252079 A1 | 10/2011 | Werner |
| 2011/0264246 A1 | 10/2011 | Pantoja |
| 2011/0312423 A1 | 12/2011 | Mosites |
| 2012/0127284 A1* | 5/2012 | Bar-Zeev ............. G02B 27/017 348/53 |
| 2012/0129598 A1 | 5/2012 | Chao |
| 2012/0172098 A1 | 7/2012 | Baker |
| 2012/0244948 A1 | 9/2012 | Dhillon |
| 2012/0244950 A1 | 9/2012 | Braun |
| 2012/0246301 A1 | 9/2012 | Vyrros |
| 2012/0258802 A1* | 10/2012 | Weston .................. A63H 30/04 463/37 |
| 2012/0270623 A1 | 10/2012 | Walker |
| 2012/0316999 A1* | 12/2012 | Koh ........................ G06T 19/00 705/27.2 |
| 2012/0322545 A1 | 12/2012 | Arnone |
| 2012/0329551 A1 | 12/2012 | Arezina |
| 2013/0017870 A1 | 1/2013 | Parker |
| 2013/0045804 A1 | 2/2013 | Ruke |
| 2013/0061260 A1 | 3/2013 | Maskatia |
| 2013/0137522 A1 | 5/2013 | Kusano |
| 2013/0159519 A1 | 6/2013 | Hochberg |
| 2013/0184064 A1 | 7/2013 | Manning |
| 2013/0196757 A1 | 8/2013 | Latta |
| 2013/0225305 A1* | 8/2013 | Yang ...................... A63F 13/00 473/152 |
| 2014/0024445 A1* | 1/2014 | Aller .................... G07F 17/3225 463/29 |
| 2014/0024464 A1 | 1/2014 | Belakovsky |
| 2014/0028850 A1* | 1/2014 | Keating ................ G06T 19/006 348/158 |
| 2014/0066176 A1 | 3/2014 | Letourneau |
| 2014/0094315 A1 | 4/2014 | Stine |
| 2014/0113716 A1 | 4/2014 | Mukhopadhyay |
| 2014/0121015 A1 | 5/2014 | Massing |
| 2014/0128161 A1 | 5/2014 | Latta |
| 2014/0192084 A1* | 7/2014 | Latta ....................... G06F 21/10 345/633 |
| 2014/0221084 A1 | 8/2014 | Morrison, III |
| 2014/0258394 A1 | 9/2014 | Lucero |
| 2014/0302915 A1 | 10/2014 | Lyons |
| 2014/0309002 A1* | 10/2014 | O'Gorman .......... G07F 17/3267 463/7 |
| 2014/0370992 A1 | 12/2014 | Cudak |
| 2014/0378214 A1 | 12/2014 | Suzuki |
| 2015/0005052 A1 | 1/2015 | Harrington |
| 2015/0011277 A1 | 1/2015 | Wakeford |
| 2015/0080083 A1* | 3/2015 | Tamaoki ................. A63F 13/85 463/17 |
| 2015/0080127 A1* | 3/2015 | Tamaoki ............... A63F 13/803 463/31 |

OTHER PUBLICATIONS

Totilo, Assassin's Creed Unity Finally Drops App, Web Requirements for Unlocks [Update], Dated Feb. 18, 2015, 5pgs.
A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.
World of Warcraft Armory, URL: https://play.google.com/store/apps/details?id=com.blizzard.wow&hl=en [retrieved Jan. 20, 2016] 4pgs.
Companion App (iFruit)—GTA 5 Wiki Guide—IGN, URL http:www.ign.com/wikis/gta-5/Companion_App_(iFruit)) [retrieved Jan. 20, 2016] 17pgs.
The Free GTAV iFruit and Game Manual Companion Apps, URL: http://www.rockstargames.com/newswire/article/51371/the-free-gtav-ifruit-and-game-manual-companion-apps.html [retrieved on Jan. 20, 2016] 5 pgs.
FIFA 16—Companion App—EA Sports, URL: https://www.easports.com/fifa/features/companion-app [retrieved Jan. 22, 2016] 5pgs.

* cited by examiner

SYSTEMS AND METHODS FOR MAKING PROGRESS OF A USER CHARACTER OBTAINED IN AN ONLINE GAME VIA A NON-VIRTUAL REALITY INTERFACE AVAILABLE IN A VIRTUAL REALITY INTERFACE

FIELD OF THE DISCLOSURE

This disclosure relates to a system and method for making progress of a user character obtained in an online game via a non-virtual reality interface available in a virtual reality interface.

BACKGROUND

Typically, online mobile games are played via non-virtual reality platforms. Incorporating virtual-reality platforms into online games accessible via mobile platforms presents a challenge because users may get caught up in virtual reality gameplay and avoid playing the online game via the mobile platforms. However, due to the immersive and restrictive nature of virtual reality, it may not be played as frequently or while a user is on-the-go. This may cause game providers to lose monetization of the online game via the mobile application play because users may stop playing the online game via the mobile platform once they have experienced virtual reality. Achieving a balance between enticing users to experience virtual reality without losing mobile platform gameplay presents a unique challenge for online game providers.

SUMMARY

One aspect of the disclosure relates to making progress of a user character obtained in an online game via a non-virtual reality interface available in a virtual reality interface. The system may be configured to provide an online game that may be played via multiple platforms. The multiple platforms may include virtual reality platforms and non-virtual reality platforms. The non-virtual reality platforms may have limited functionality. For example, actions available to be performed via a non-virtual reality platform may be limited compared to those available to be performed via a virtual reality platform. Progress made by a user via the non-virtual reality platform may be monitored such that the user is awarded an amount of a virtual resource based on the progress. The user may request to exchange at least a portion of the virtual resource for an enhancement of the an ability for a virtual character. The system may receive the request and enhance the ability for the virtual character wherein the enhancement is reflected in the online game via the virtual reality platform. As such, the system and/or method described herein may encourage users to play the game and progress within the game via non-virtual reality platforms, while also incentivizing users within the virtual reality platform.

A system that makes progress of a user character obtained in an online game via a non-virtual reality interface available in a virtual reality interface may include one or more servers. The servers may operate in a client/server architecture with one or more client computing platforms. The client computing platforms may be associated with the users of the online game. The servers may be configured to execute one or more of: a game component, a gameplay component, a user component, an award component, an ability component, and/or other components. The client computing platforms may be configured to execute one or more components the same as or similar to the servers.

The game component may be configured to execute a game instance of an online game played via multiple platforms. The multiple platforms may include virtual reality platforms and non-virtual reality platforms. For example, the virtual reality platforms may include a first platform associated with a first user. The first platform may provide a virtual reality interface to the first user. The non-virtual reality platforms may include a second platform associated with the first user. The second platform may provide a non-virtual reality interface to the first user. The second platform may have limited functionality compared to the first platform.

The game component may be configured to use the game instance to generate game state information that is transmitted to the client computing platforms over a network. The game state information may facilitate presentation of views of the online game to the users via the client computing platforms. The game component may transmit the game state information over the network to the client computing platforms. Transmitting the game state information may cause the client computing platforms to present views of the online game. Views of the online game presented via a virtual reality platform providing a virtual reality interface may include views presented via head-mounted display device and/or other immersive views (e.g., causing the user to have the perception of being physically present in a virtual world). Views of the online game presented via a non-virtual reality platform providing a non-virtual reality interface may include views presented on a touch screen, mobile device display, television, computer monitor, and/or other displays (e.g., not fully immersive displays such that the user does not have the perception of being physically present in a virtual world).

The gameplay component may be configured to monitor gameplay progress made by the first user through actions requested via the second platform (e.g., the non-virtual reality platform). For example, the gameplay progress may include one or more of defeating a boss, achieving a level within the online game, winning a battle, resisting an attack, building and/or rebuilding a virtual entity, healing a virtual character and/or a non-user character, unlocking game content, developing a skill, leveling-up, completing one or more experience segments of the online game, and/or other progress within the online game.

The user component may be configured to manage one or more user accounts associated with individual users of the online game. The user accounts may include user information regarding the individual users of the online game. For example, the user accounts may include inventory information, virtual resources and/or currency information, gameplay progress information, and/or other information. A virtual resource may be a resource that can be exchanged to enhance one or more abilities for a virtual character. The virtual resources may include one or more of virtual currency, virtual items, points, energy, non-player characters, building materials, natural virtual resources, and/or other virtual resources.

The award component may be configured to award an amount of virtual resources to the first user for the gameplay progress made by the first user through actions requested via the second platform. The virtual resource may be redeemable for enhanced abilities for one or more virtual characters controlled by the user in the online game. The abilities for a virtual character associated with the user may include an ability to access a game level, an ability to access game content, an ability to access and/or use virtual items, a stamina associated with the virtual character, a healing rate associated with the virtual character, a respawn rate for the virtual character, a skill of the virtual character, a power of the virtual character, an ability of the user and/or virtual character to perform one or more actions, a resistance of the virtual character, and/or other abilities.

The ability component may be configured to receive a request from the second platform to exchange at least a portion of the amount of the virtual resource for an enhancement of a first ability for a first virtual character controlled by the first user in the online game. The ability component may be configured to enhance the first ability for the first virtual character in response to receipt of the request. Enhancing an ability may include improving the ability, changing the ability, adjusting the ability, increasing the ability, enabling the ability, and/or otherwise enhancing the ability. Enhancement of the first ability for the first virtual character may be reflected in the online game via the first platform. The first user may be able to perform actions within the virtual reality interface in accordance with the enhancement.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
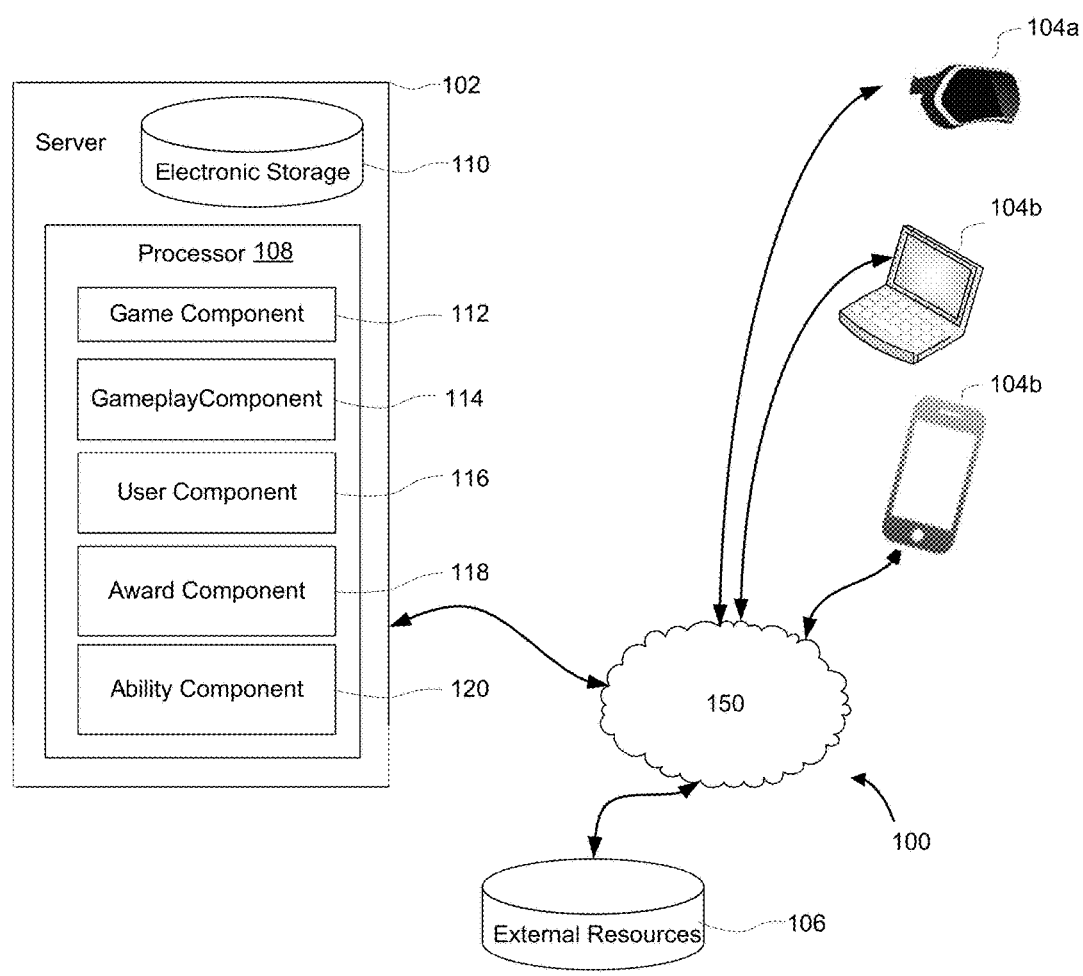
FIG. 1 illustrates a system that makes progress of a user character obtained in an online game via a non-virtual reality interface available in a virtual reality interface, in accordance with one or more implementations.

FIG. 1 illustrates a system 100 that makes progress of a user character obtained in an online game via a non-virtual reality interface available in a virtual reality interface. The online game may be played via multiple client computing platforms. The client computing platforms may include virtual reality platforms and non-virtual reality platforms. The virtual reality platforms may provide a virtual reality interface to the users. The non-virtual reality platforms may provide a non-virtual reality interface to the users. The virtual reality platforms may present views of the online game in a manner that simulates immersion (e.g., the user's perception of being physically present within a non-physical world) within the online game. The online game may have a higher interactive potential when played via the virtual reality platforms than when played via the non-virtual reality platforms. For example, the virtual reality platforms may be able to support additional and/or increased motion inputs, views, visibility, and/or other interactions a user may have with the online game. However, the virtual reality platforms may also be restrictive because a user may not always have access to a virtual reality platform or may not be able to immerse themselves in the online game as required by virtual reality. Thus, a balance between playing the online game via the virtual reality platforms and the non-virtual reality platforms may enable game providers to introduce new interface experiences to the user without decreasing monetization opportunities and/or losing the flexible and constant access to the online game provided by non-virtual reality.

The online game may be provided and/or executed by system 100. Providing the online game may include hosting the online game over a network 150. In some implementations, system 100 may include one or more servers 102 configured for hosting online games. Server 102 may be configured to communicate with one or more client computing platforms 104 according to a client/server architecture, and with each other. The users may access system 100, the online game, and/or the game space associated with the online game via client computing platforms 104, such as client computing platforms 104a-b as shown. Client computing platforms 104 may include virtual reality platform(s) 104a and non-virtual reality platform(s) 104b. Server 102 may comprise a processor 108 configured to execute machine readable instructions to implement system components. The computer program components may include one or more of a game component 112, a gameplay component 114, a user component 116, an award component 118, an ability component 120, and/or other components.

Game component 112 may be configured to execute a game instance of an online game played via multiple platforms. The multiple platforms may include virtual reality platforms and non-virtual reality platforms. For example, the virtual reality platforms may include a first platform associated with a first user. The non-virtual reality platforms may include a second platform associated with the first user. Game component 112 may be configured to use the game instance to generate game state information that is transmitted to client computing platforms over a network. The game state information may facilitate presentation of views of the online game to the users via the client computing platforms.

Game component 112 may transmit the game state information over the network to the client computing platforms. Transmitting the game state information may cause the client computing platforms to present views of the online game. Views of the online game presented via a virtual reality platform may include views presented on a head-mounted display device and/or other immersive views (e.g., causing the user to have the perception of being physically present in a virtual world). Views of the online game presented via a non-virtual reality platform may include views presented on a touch screen, television, computer monitor, and/or other non-immersive views (e.g., not fully immersive such that the user does not have the perception of being physically present in a virtual world). The virtual reality platforms, including the first platform, may provide a virtual reality interface to the first user. The non-virtual reality platforms, including the second platform, may provide a non-virtual reality interface to the first user.

The non-virtual reality platforms may have limited functionality compared to the virtual reality platforms. For example, the second platform may have limited functionality compared to the first platform. Limited functionality may relate to the actions available to be performed by one or more users via the platform and/or the way actions are performed by the users via the platform. In some implementations, the device(s) providing the non-virtual reality platform may be less capable then the device(s) providing the virtual reality platform. By way of non-limiting example, an attack action via a non-virtual reality platform may be limited to a general, straight on attack actions having a twitch type of gameplay. An attack action via a virtual reality platform may be more controllable by the user such that form of the input (e.g., via the user performing the action), location of the strike, depth and/or positioning of the attack, and/or other input parameters may be available due to the immersive capabilities of the virtual reality platform. In some implementations, limited functionality may be limited available actions. To illustrate, actions available to be performed by the first user in the online game via the second platform may be limited compared to the actions available to be performed via the first platform.

Game component 112 may transmit the game state information over network 150 to the client computing platforms 104, causing client computing platforms 104 to present views of the online game. Views of the online game presented via virtual reality platform 104a may include views presented via a head-mounted display device. The views may be presented stereoscopically—one for each eye—via the head mounted display device. The user's brain may combine the views creating a three-dimensional experience. The head mounted display device may include a head and/or eye tracking system that tracks movement of the user as they move their head, eyes, and/or themselves around in physical space to select views and/or move about the online game (e.g., the virtual space in which the online game is played). Views of the online game presented via a non-virtual reality platform may include views presented on a display for one or more of a mobile device (e.g., a smart phone, tablet, laptop), desktop computer, gaming console, televisions, and/or other non-virtual reality platforms.

In some implementations, the game content for the online game provided to the users via the virtual reality platforms may be different than the game content provided to the users via the non-virtual reality platforms. For example, different, but related game content, may be provided to the users via the non-virtual reality platforms compared to the virtual reality platforms.

Execution of the game instance may enable interaction by the users with the online game and/or each other. Game component 112 may be configured to perform operations in the game instance in response to commands received over network 150 from client computing platforms 104. Users may participate in the online game through client game applications implemented on the client computing platforms 104 associated with the users.

Within the instance of the online game, users may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the online game by game component 112 may include determining a game state associated with the online game. The game state information may include information defining a virtual space in which the online game is played. The state may be communicated (e.g., via streaming visual data, via object/ position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user. In some implementations, when the user is playing the online game via the virtual reality platforms, the view may be selected by the user based on their head and/or eye movement.

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

The online game may be played within a simulated virtual space, e.g., a virtual space that is accessible by users via clients (e.g., client computing platforms 104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise virtual entities automatically controlled in the online game. Such virtual entities may not be associated with any user. As such, the automatically controlled virtual entities may be generated and/or developed by artificial intelligence configured with the server(s) 102 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 102. As used herein, such automatically controlled virtual space entities in the instance of the online game are referred to as "non-player entities".

It should be understood the above description of the manner in which state of the virtual space associated with the online game as determined by game component 112 is not intended to be limiting. The game component 112 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Within the instance of the online game executed by game component 112, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the online game may be exercised through commands input by a given user through and/or by client computing platforms 104. The given user may interact with other users through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the game component 112).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via virtual reality 104a platform, a given user may input a broader range of commands compared to those available on non-virtual reality platform 104b. The input commands via the virtual reality platform 104a may include the user performing the action as an input command. The user may also be able to look around and/or move about the virtual space in which the online game is played via the virtual reality platform.

The game component 112 may be configured to execute and/or perform user actions to facilitate participation of the users in the online game and/or with each other in response to receiving game commands input by the users. Execution and/or performance of the user action by the game component 112 may produce changes to the game state, which may reflect progresses and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

Gameplay component 114 may be configured to monitor gameplay progress made by the users via the non-virtual reality platforms. For example, gameplay progress made by the first user through actions requested via the second platform (e.g., the non-virtual reality platform) may be monitored by gameplay component 114. Gameplay progress made by the users via the non-virtual reality platforms may include one or more actions that progress and/or may cause progression of a user along a skill tree of the online game. For example, the gameplay progress may include one or more of defeating a boss, achieving a level within the online game, winning a battle, resisting an attack, building and/or rebuilding a virtual entity, healing a virtual character and/or a non-user character, unlocking game content, developing a skill, leveling-up, completing one or more experience segments of the online game, and/or other progress within the online game. The virtual entities built and/or rebuilt via user actions requested via the non-virtual reality platforms may include non-user characters (e.g., virtual armies, etc.), virtual structures, and/or other virtual entities that may be built, depleted, and/or damaged within the online game. Virtual characters may sustain injury and/or damage within the online game wherein the actions requested via the non-virtual reality platform may heal and/or repair one or more of the virtual characters.

The users actions requested via the non-virtual reality platform may progress the user towards unlocking game content (e.g., a level, world, virtual item, virtual entity, etc.) within the online game. In some implementations, the user may develop one or more skills of the virtual character via actions requested through the non-virtual reality platform. In some implementations, the gameplay progress made through actions requested via the non-virtual reality platforms may include completion of one or more experience segments. The experience segments may include portions of the online game that may be completed and/or played by the users. For example, experience segments may include one or more of a game tile, game level, event, challenge, quest, nodes, mini-game, and/or other experience segment within the online game.

In some implementations, one or more of the actions requested via the non-virtual reality platform may not be able to be requested by a user via the virtual reality platform. For example, one or more of the actions requested via the second platform may not be able to be requested by the first user via the first platform. In some implementations, wherein users may perform one or more actions via the virtual reality platform and the non-virtual reality platform, performing actions via the non-virtual reality platform may be more advantageous to the user. For example, performing the actions available to be performed by the first user via the second platform may provide more gameplay progress and/or similar gameplay progress but faster than performing the same or similar actions via the first platform.

In some implementations, system 100 may include user component 116. User component 116 may be configured to manage one or more user accounts associated with individual users of the online game. User component 116 may be configured to store gameplay progress made by the users user through actions requested via the non-virtual reality platforms.

The user accounts managed by user component 116 may include user information regarding the individual users of the online game. The user information may be stored in a network storage location such as the electronic storage 110, and/or any other storage locations. User component 116 may be configured to manage user accounts comprising user information regarding the users. The user information managed by user component 116 and/or included in the user accounts may include gameplay information indicating gameplay progress made by the users via the non-virtual reality platforms. The gameplay information may be determined by gameplay component 114 by monitoring gameplay progress by the users via the non-virtual reality platforms. The user profiles may include a first user profile for the first user.

The user profiles may include, for example, personal information identifying users (e.g., a username or handle, a number, an identifier, and/or other identifying information) within the online game, payment information (e.g., information associated with a method of payment and/or an account, and/or whether a payment method has been established for a given platform), security login information (e.g., a login code or password), online game account information, subscription information, character account information (e.g., gameplay progress information, virtual characters associated with the user, a status and/or characteristics of the virtual characters, a level of the virtual characters, etc.), platform information (e.g., virtual reality platform(s) and/or non-virtual reality platforms associated with a user), virtual resources and/or currency account information (e.g., related to virtual resources and/or virtual currency obtained and/or held in credit for a user), relationship information (e.g., information related to relationships between users in the online game), inventory information, online game usage information, demographic information associated with users, and/or other information related to users.

The user component 116 may be configured to store inventories of virtual items including virtual resources that are available to users in the online game. Various matters may be collected in an inventory. These matters may include, but are not limited to, virtual items, virtual resources, character attributes, character skills, and/or other virtual matters. The virtual resources may be earned by the users for the gameplay progress made through actions requested via the non-virtual reality platforms. A virtual resource may be a resource that can be exchanged to enhance one or more abilities for a virtual character. The virtual resources may include one or more of virtual currency, virtual items, points, energy, non-player characters, building materials, natural virtual resources, and/or other virtual resources. Virtual currency may be consideration for use within the online game. Virtual currency may be represented by virtual coins, virtual gems, virtual crystals, virtual cash, or by a number or value stored by the server for that user's benefit. Such virtual currency represents units of value for use in the online game system. Virtual currency may be purchased in one or more actual cash or credit transactions by a user, where the real world currency is transferred using a credit/debit/charge card transaction conveyed over a financial network. A user may earn virtual currency for gameplay progress. For example, a user may be rewarded with one or more units of virtual currency after making progress via actions requested via the non-virtual reality platform, completing a task, quest, challenge, and/or mission within the game.

Virtual currency may be used to purchase one or more in-game assets or other benefits. For example, a player may be able to exchange virtual currency for an enhancement of an ability for a virtual character, a desired level, access, right, or item in an online game. Multiple types of virtual currency may be available for purchase from the game system operator. In some embodiments, certain types of virtual currency can be acquired by engaging in various in-game actions while other types of virtual currency can only be acquired by exchanging real-world currency. A virtual item may be an item associated with a given ability and/or an item that can be used in a virtual world to assist a player's character. Examples of virtual items include, but are not limited to, weapons, spell components, defense components, armor, and/or other virtual items. Players may collect, trade, buy, fight over items, and/or perform other actions to add to their inventory. Energy may include stamina and/or energy of a virtual character within the online game. Non-player characters may include, by way of non-limiting example, one or more of armies/soldiers, wizards, monsters, bosses, and/or other non-player characters (NPCs). Building materials may include one or more virtual items for building, upgrading and/or enhancing one or more virtual entities and/or structures. Examples of natural virtual resources include wood, stone, herbs, water, ores, animals, and/or other natural resources and/or materials.

The user information in the user account associated with the given user for the online game may include historic transaction information indicating previous spending by the user in the online game via a given platform. In some exemplary implementations, such historic transaction information may reflect various statistics and details about the individual spending by the user via individual ones of the virtual reality platform(s) and/or the non-virtual reality platform(s). Examples of such statistics may include purchases made within the online game when played via a given platform, when purchases were made in the online game when played via a given platform, an amount of virtual and/or real currency spent, a number of times a user spends virtual and/or real currency in exchange for virtual items (e.g., a number of transactions), a frequency of such spending by the user with in a time period of interest (e.g., past 24 hours, past week, past month, etc.), a spend velocity (e.g., rate of spending), and/or any other statistics.

Award component 118 may be configured to award an amount of a virtual resource to users for gameplay progress made by actions requested through non-virtual reality platforms. For example, award component 118 may be configured to award an amount of virtual resources to the first user for the gameplay progress made by the first user through actions requested via the second platform. The virtual resource may be redeemable for enhanced abilities for one or more virtual characters controlled by the user in the online game. The abilities for a virtual character associated with the user may include an ability to access a game level, an ability to access game content, an ability to access and/or use virtual items, a stamina associated with the virtual character, a healing rate associated with the virtual character, a respawn rate for the virtual character, a skill of the virtual character, a power of the virtual character, an ability to perform one or more actions, a resistance of the virtual character, and/or other abilities.

By way of non-limiting example, award component 118 may be configured to award points to a user for completing one or more game tiles and/or reaching one or more levels within the online game via the non-virtual reality platform. The points may be redeemable for a 15% increase in power for the virtual character (e.g., 15% increase in power of attacks). By way of another non-limiting example, award component 118 may be configured to award a sword to user for building an army base within the online game via the non-virtual reality platform. The sword may be redeemable for the ability of the virtual character to use the sword (e.g., increasing a effectiveness of an attack by the virtual character) within the online game.

By way of another non-limiting example, award component 118 may be configured to award an amount of gems to a user for resisting an attack by actions requested via the non-virtual reality platform. At least a portion of the amount of gems awarded may be redeemable for increasing the stamina and/or resistance for the virtual character.

A power of the virtual character may relate to the effectiveness, damage inflicted, and/or power associated with one or more actions performed by the virtual character within the online game. The power of a virtual character may include their attack power and/or the amount damage inflicted on their opponent. Virtual character skills may be game attributes inherent in or acquired by a virtual character during game play such as, but not limited to: the ability to cast (certain) spells, foretell the future, read minds, use (certain) weapons, cook, hunt, find herbs, assemble herbs into potions, mine, assemble objects into other objects, fly, enchant other player characters, and/or other character skills. A resistance of the virtual character may include the virtual character's resistance to an attack.

Ability component 120 may be configured to receive requests from the non-virtual reality platforms associated with the users to exchange a portion of the virtual resource for an enhancement of an ability for a virtual character. The requests may be received by ability component 120, over network 150. For example, a request from the second platform to exchange at least a portion of the amount of the virtual resource for an enhancement of a first ability for a first virtual character controlled by the first user in the online game may be received.

Ability component 120 may be configured to enhance the first ability for the first virtual character in response to receipt of the request. Enhancing an ability may include improving the ability, adjusting the ability, increasing the ability, enabling the ability, and/or otherwise enhancing the ability. In some implementations, enhancement of the first ability for the first virtual character is reflected in the online game via the first platform. The enhancement of the first ability may be in response to receipt of the request from the second platform. As such, for example, the first user may be able to perform actions within the virtual reality interface in accordance with the enhancement.

By way of non-limiting example, a first user may perform attack actions within the online game via the non-virtual reality platform such that the user's performance of attack options defeats a boss associated with a given level in the online game. Continuing the example, the user may be awarded a medal for defeating the boss wherein the medal may be exchanged for a virtual character's ability to access a new level such that when playing the online game via the virtual reality platform, the virtual character is able to access the new level.

Figure 2:
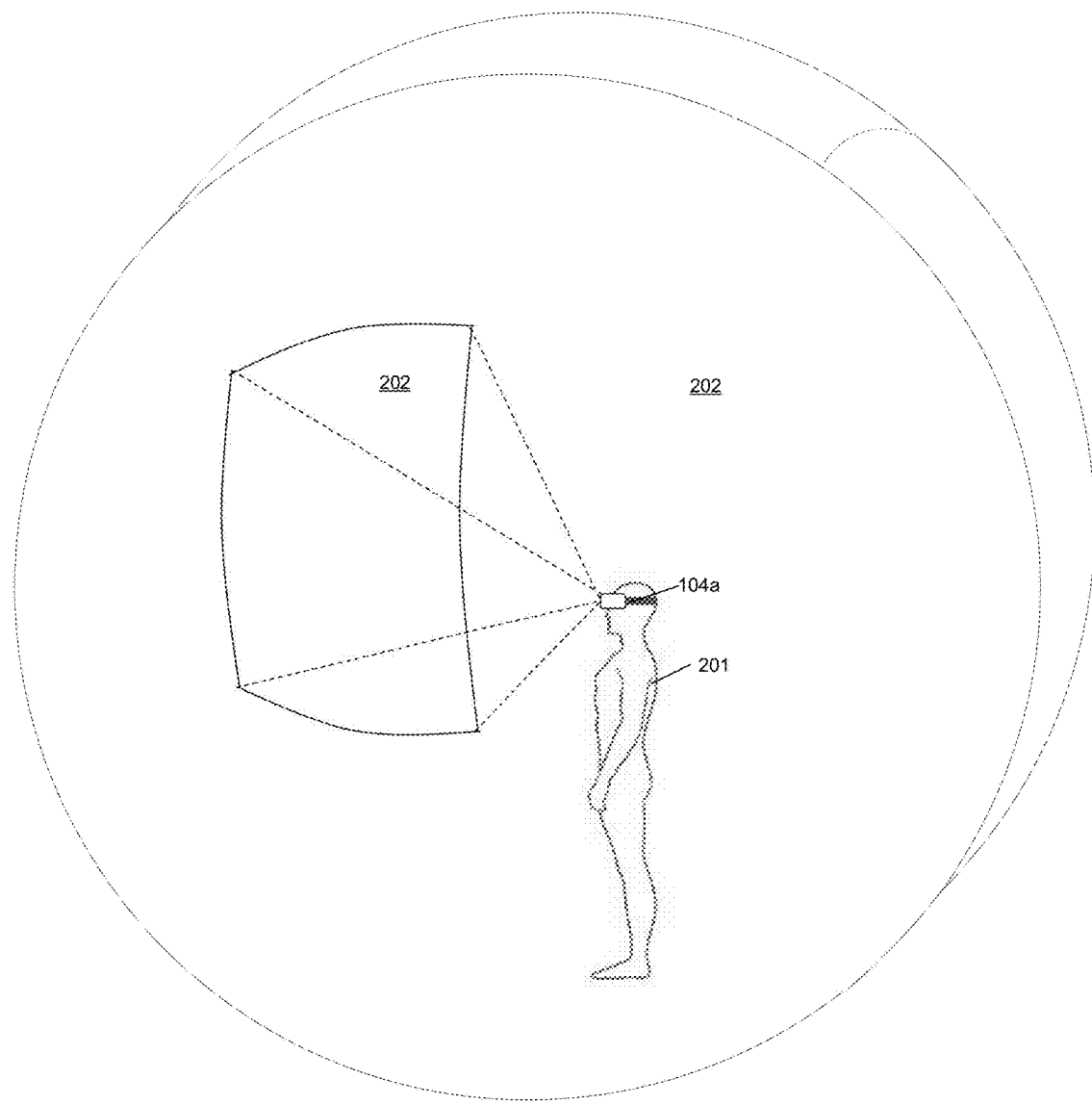
FIG. 2 depicts a virtual reality interface provided by virtual reality platform, in accordance with one or more implementations.

FIG. 2 depicts a virtual reality interface 202 provided by virtual reality platform 104a. The views of the online game provided via virtual reality interface 202 may include immersive views that cause user 201 to have the perception of being physically present in a virtual world in which the online game is played. Enhancement of an ability for a virtual character, earned via gameplay progress made in a non-virtual reality interface, may be reflected in virtual reality interface 202. User 201 may be able to perform actions within virtual reality interface 202 in accordance with the enhancement.

Returning to FIG. 1, the client computing platform(s) 104 may include one or more processors, memory, display devices, head-mounted display devices, sensors, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 100.

The client computing platform(s) 104 may be configured to: present a graphical representation of the virtual space (e.g., a virtual reality representation and/or a non-virtual reality representation) corresponding to a given online game; provide controls and/or sense input commands enabling the given user to maneuver virtual items, initiate actions, and/or purchase virtual item(s) usable in the online game(s) within the virtual space associated with the online game; determine information for implementing game interfaces for the online game(s) hosted by system 100; obtain state information regarding a given online game hosted by the system 100; determine view information (e.g., a view point, field of view, eye/head movement, and/or location) of the user at a given time; determine a level of rendering of a scene in the online game based on the state information and view information; determining one or more action menus for presentation to the user in the game interface; facilitate interaction by the given user in the online game(s) and/or interaction with other users; communicate with sever(s) 102 (e.g., receive and/or transmitting information to/from servers 102); and/or provide any other functionality. In some implementations, client computing platform 104 may be a virtual reality platform and/or a non-virtual reality platform. Client computing platform 104 may be configured to communicate with, transmit information to, and/or receive information from one or more of servers 102, and/or other components of system 100.

The server(s) 102, client computing platform(s) 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a virtual reality system, a head-mounted virtual reality display, desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server(s) 102 may include electronic storage 110, one or more processors 108, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 110 may comprise electronic storage media that electronically stores information. The electronic storage media of electronic storage 110 may include one or both of system storage that is provided integrally (i.e., substantially non-removable) with server(s) 102 and/or removable storage that is removably connectable to server(s) 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 110 may include one or more virtual storage resources (e.g., cloud storage, a virtual private network, and/or other virtual storage resources). Electronic storage 110 may store software algorithms, information determined by processor 108, information received from server(s) 102, information received from client computing platforms 104, and/or other information that enables server(s) 102 to function as described herein.

Processor(s) 108 is configured to provide information processing capabilities in server(s) 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120. Processor 108 may be configured to execute components 112, 114, 116, 118, 120 by software; hardware; firmware; some combination of software, hardware, and/or firmware; and/or other mechanisms for configuring processing capabilities on processor 108.

It should be appreciated that although components 112, 114, 116, 118, 120 are illustrated herein as being co-located within a single processing unit, in some other implementations, one or more of components 112, 114, 116, 118, 120 may be located remotely from the other components. The description of the functionality provided by the different components 112, 114, 116, 118, 120 described below is for illustrative purposes, and is not intended to be limiting, as any of components 112, 114, 116, 118, 120 may provide more or less functionality than is described. For example, one or more of components 112, 114, 116, 118, 120 may be eliminated, and some or all of its functionality may be provided by other ones of components 112, 114, 116, 118, 120. As another example, processor 108 may be configured to execute one or more additional components that may perform some or all of the functionality attributed below to one of components 112, 114, 116, 118, 120.

Figure 3:
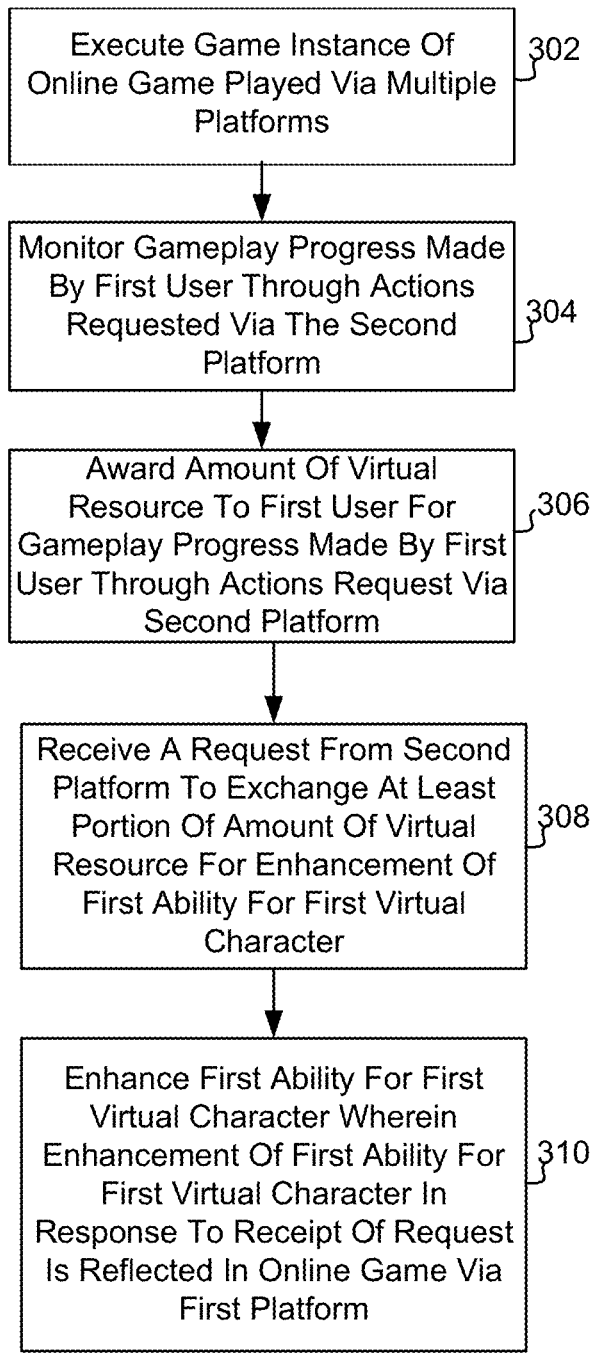
FIG. 3 illustrates a method that makes progress of a user character obtained in an online game via a non-virtual reality interface available in a virtual reality interface, in accordance with one or more implementations.

FIG. 3 illustrates a method that makes progress of a user character obtained in an online game via a non-virtual reality interface available in a virtual reality interface, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/ or software to be specifically designed for execution of one or more of the operations of method 300.

At an operation 302, a game instance of the online game played via multiple platforms may be executed. The game instance may be used to generate game state information that is transmitted to client computing platforms over a network. The game state information may facilitate presentation of views of the online game to the users via the client computing platforms. Execution of the game instance further enables interaction by the users with the online game and/or each other by performing operations in the game instance in response to commands received over the network from the client computing platforms. The client computing platforms may include virtual reality platforms and non-virtual reality platforms. The virtual reality platforms may include a first platform that provides a virtual reality interface to a first user. The non-virtual reality platforms may include a second platform that provides a non-virtual reality interface to the user. The second platform may have a limited functionality compared to the first platform. Actions available to be performed by the first user in the online game via the second platform may be limited compared to the actions available to be performed via the first platform. In some implementations, operation 302 may be performed by a game component the same as or similar to game component 112 (shown in FIG. 1 and described herein).

At an operation 304, gameplay progress may be monitored. Gameplay progress made by the first user through actions requested via the second platform may be monitored. In some implementations, operation 304 may be performed by a gameplay component the same as or similar to gameplay component 114 (shown in FIG. 1 and described herein).

At operation 306, an amount of a virtual resource may be awarded to the first user. The amount of virtual resource may be awarded to the first user for the gameplay progress made by the first user through actions requested via the second platform. The virtual resource may be redeemable for enhanced abilities for one or more virtual characters controlled by the first user in the online game. In some implementations, operation 306 may be performed by a reward component the same as or similar to award component 118 (shown in FIG. 1 and described herein).

At operation 308, a request may be received from the second platform to exchange at least a portion of the amount of the virtual resource for an enhancement of a first ability. The enhancement of the first ability may be for a first virtual character controlled by the first user in the online game. In some implementations, operation 308 may be performed by an ability component the same as or similar to ability component 120 (shown in FIG. 1 and described herein).

At operation 310, the first ability for the first virtual character may be enhanced. The first ability for the first virtual character may be enhanced in response to receipt of the request. Enhancement of the first ability for the first virtual character in response to receipt of the request may be reflected in the online game via the first platform. As such, the first user may be able to perform actions within the virtual reality interface in accordance with the enhancement. In some implementations, operation 310 may be performed by an ability component the same as or similar to ability component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that makes progress of a user character obtained in an online game via a non-virtual reality interface available in a virtual reality interface, the system comprising:
   one or more physical computer processors configured by machine-readable instructions to:
      execute a game instance of the online game played via multiple platforms, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform that provides a virtual reality interface to a first user, and the non-virtual reality platforms including a second platform that provides a non-virtual reality interface to the user;
   wherein performing actions available to be performed by the first user in the online game via the second platform provides more gameplay progress and/or similar gameplay progress faster to the first user than performing same or similar actions via the first platform;
   monitor gameplay progress made by the first user through actions requested via the second platform;
   award an amount of a virtual resource to the first user for the gameplay progress made by the first user through actions requested via the second platform, the virtual resource being redeemable for enhanced abilities for one or more virtual characters controlled by the first user in the online game;
   receive a request from the second platform to exchange at least a portion of the amount of the virtual resource for an enhancement of a first ability for a first virtual character controlled by the first user in the online game;
   enhance the first ability for the first virtual character in response to receipt of the request; and
   wherein enhancement of the first ability for the first virtual character in response to receipt of the request is reflected in the online game via the first platform, such that the first user is able to perform actions within the virtual reality interface in accordance with the enhancement.

2. The system of claim 1, wherein the first ability includes one or more of an ability to access a game level, an ability to access game content, an ability to access and/or use virtual items, stamina, healing rate, respawn rate, skill, power, an ability to perform one or more actions, and/or resistance of or for the first virtual character.

3. The system of claim 1, wherein the virtual resource includes one or more of virtual currency, virtual items, points, energy, non-player characters, building materials, and/or natural virtual resources.

4. The system of claim 1, wherein the gameplay progress made by the user through actions requested via the second platform includes one or more of defeating a boss, achieving a level, winning a battle, resisting an attack, building and/or rebuilding a virtual entity, healing a user character and/or a non-user character, unlocking game content, developing a skill, and/or completing one or more experience segments of the online game.

5. The system of claim 1, wherein the second platform includes a mobile device including one or more of a smart phone, tablet, and/or laptop computer.

6. The system of claim 1, wherein the first platform includes a virtual reality head-mounted display device.

7. The system of claim 1, wherein the one or more physical computer processors are further configured by machine-readable instructions to:
transmit the game state information over the network causing the first platform to present the views of the online game to the first user via a head-mounted display device associated with the first platform.

8. The system of claim 1, wherein the virtual reality interface has a higher interactive potential than the non-virtual reality interface, the interactive potential indicating a level of interactions, inputs, and/or views available to the users in the virtual reality interface provided via the first platform and the non-virtual reality interface provided via the second platform.

9. The system of claim 1, wherein one or more of the actions requested via the second platform cannot be requested by the first user via the first platform.

10. The system of claim 1, wherein the second platform has limited functionality compared to the first platform and wherein the actions available to be performed by the first user in the online game via the second platform are limited compared to the actions available to be performed via the first platform.

11. A game server implemented method that makes progress of a user character obtained in an online game via a non-virtual reality interface available in a virtual reality interface, the method being implemented by a computer system including one or more physical processors configured by machine-readable instructions, the method comprising:
executing a game instance of the online game played via multiple platforms, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform that provides a virtual reality interface to a first user, and the non-virtual reality platforms including a second platform that provides a non-virtual reality interface to the user;
wherein performing actions available to be performed by the first user in the online game via the second platform provides more gameplay progress and/or similar gameplay progress faster to the first user than performing same or similar actions via the first platform;
monitoring gameplay progress made by the first user through actions requested via the second platform;
awarding an amount of a virtual resource to the first user for the gameplay progress made by the first user through actions requested via the second platform, the virtual resource being redeemable for enhanced abilities for one or more virtual characters controlled by the first user in the online game;
receiving a request from the second platform to exchange at least a portion of the amount of the virtual resource for an enhancement of a first ability for a first virtual character controlled by the first user in the online game;
enhancing the first ability for the first virtual character in response to receipt of the request; and
wherein enhancement of the first ability for the first virtual character in response to receipt of the request is reflected in the online game via the first platform, such that the first user is able to perform actions within the virtual reality interface in accordance with the enhancement.

12. The method of claim 11, wherein the first ability includes one or more of an ability to access a game level, an ability to access game content, an ability to access and/or use virtual items, stamina, healing rate, respawn rate, skill, power, an ability to perform one or more actions, and/or resistance of or for the first virtual character.

13. The method of claim 11, wherein the virtual resource includes one or more of virtual currency, virtual items, points, energy, non-player characters, building materials, and/or natural virtual resources.

14. The method of claim 11, wherein the gameplay progress made by the user through actions requested via the second platform includes one or more of defeating a boss, achieving a level, winning a battle, resisting an attack, building and/or rebuilding a virtual entity, healing a user character and/or a non-user character, unlocking game content, developing a skill, and/or completing one or more experience segments of the online game.

15. The method of claim 11, wherein the second platform includes a mobile device including one or more of a smart phone, tablet, and/or laptop computer.

16. The method of claim 11, wherein the first platform includes a virtual reality head-mounted display device.

17. The method of claim 11, further comprising:
transmitting the game state information over the network causing the first platform to present the views of the online game to the first user via a head-mounted display device associated with the first platform.

18. The method of claim 11, wherein the virtual reality interface has a higher interactive potential than the non-virtual reality interface, the interactive potential indicating a level of interactions, inputs, and/or views available to the users in the virtual reality interface provided via the first platform and the non-virtual reality interface provided via the second platform.

19. The method of claim 11, wherein one or more of the actions requested via the second platform cannot be requested by the first user via the first platform.

20. The method of claim 11, wherein the second platform has limited functionality compared to the first platform and wherein the actions available to be performed by the first user in the online game via the second platform are limited compared to the actions available to be performed via the first platform.

* * * * *